Figure 6:
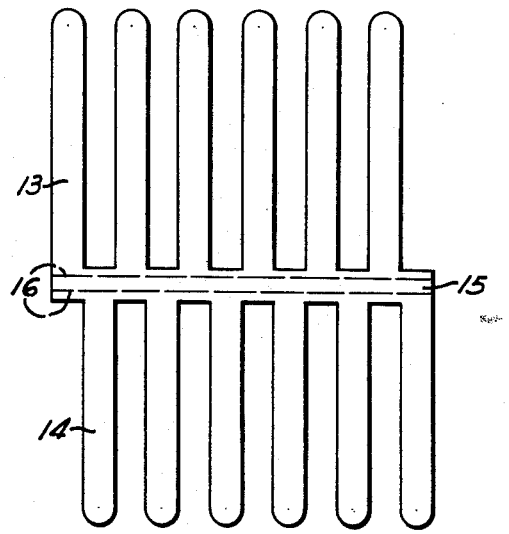

Dec. 18, 1962  R. A. BUB  3,069,018
FILTER SHEET CLAMPING AND SPACING DEVICE
Filed June 3, 1960  2 Sheets-Sheet 1
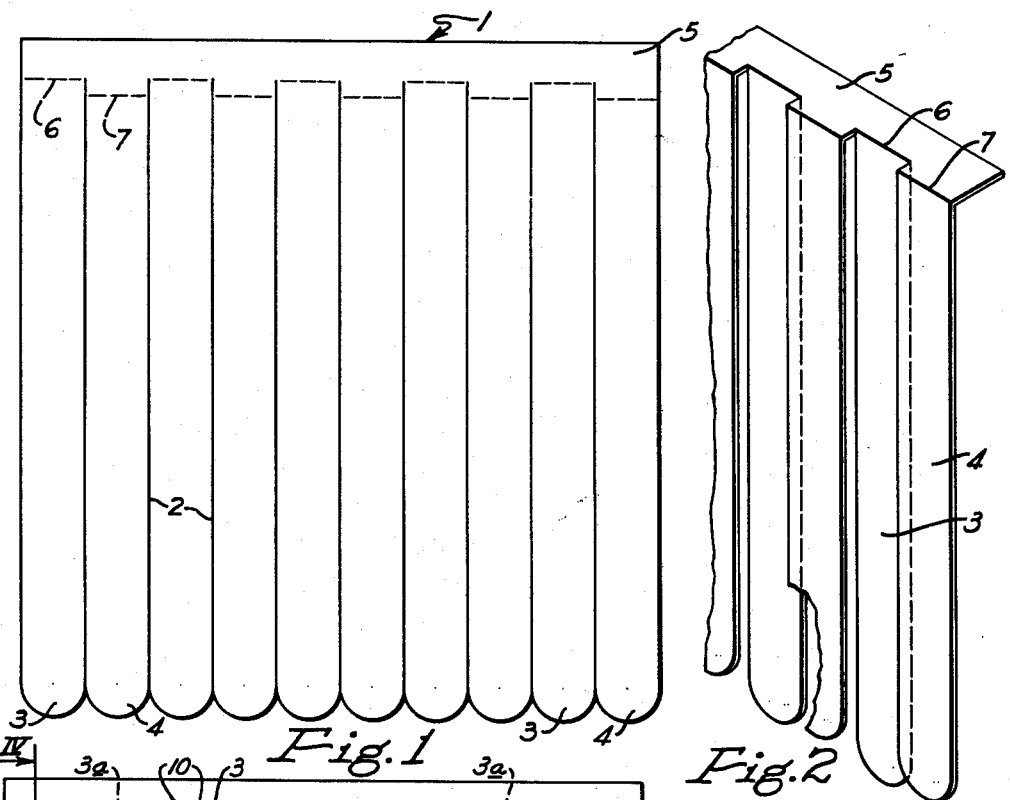
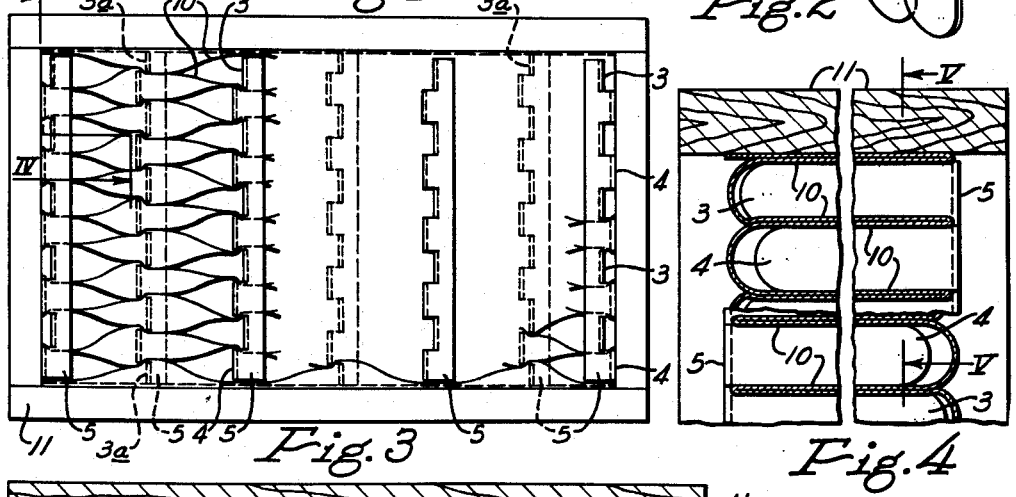
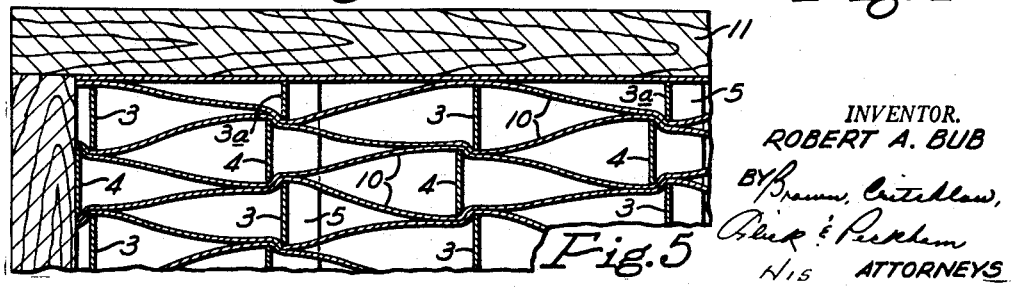
INVENTOR.
ROBERT A. BUB
HIS ATTORNEYS Dec. 18, 1962  R. A. BUB  3,069,018
FILTER SHEET CLAMPING AND SPACING DEVICE
Filed June 3, 1960  2 Sheets-Sheet 2

INVENTOR.
ROBERT A. BUB
BY
ATTORNEYS

_United States Patent Office_

3,069,018
Patented Dec. 18, 1962

3,069,018
FILTER SHEET CLAMPING AND
SPACING DEVICE
Robert A. Bub, Pittsburgh, Pa., assignor to Mine Safety
Appliances Company, a corporation of Pennsylvania
Filed June 3, 1960, Ser. No. 33,737
6 Claims. (Cl. 210—493)

This invention relates to filters, and more particularly to those in which a strip of filtering material is accordion folded and provided with laterally spaced pockets.

One known way of making a filter is to fold a long strip of filtering material back and forth upon itself, accordion like, to form a stack of sheets, fasten the adjoining sheets together as shown in patent application Serial Number 763,948 filed September 29, 1958, now U.S. Patent No. 3,025,964 issued March 20, 1962, and then expand the stack of sheets to form filter pockets. In some cases it has been proposed to not attach the filter sheets to one another, but to insert the teeth of wire "combs" between them. The back of each comb would extend across the folds, and the sheets between each pair of teeth would be pinched together by them and be spaced from the next pair of sheets. Such a comb therefore would be a sheet clamping and spacing device. Since several parallel combs would be inserted from each side of the filter element, with those at one side staggered relative to those at the opposite side, rows of parallel pockets would be formed having open ends at opposite sides of the filter element. Such a method of making a filter element would be perfectly satisfactory, but it is desirable to reduce the cost because metal combs are expensive.

It is an object of this invention to provide for use in a zigzag type filter element, inexpensive clamping and spacing devices that will form filter pockets between the filter sheets without the use of adhesives or the like. Other objects are to provide a blank, from which such a device can be folded, and a method of making the device.

In accordance with this invention, a filter sheet clamping and spacing device is made from a sheet of fairly stiff material. The device has a flat backing strip for extending across the folds joining the sheets of an accordion folded filter strip. Extending away from the backing strip in planes substantially perpendicular to its plane are two closely spaced rows of parallel tongues that are adapted to extend between the filter folds. In each row the tongues are spaced apart a distance substantially equal to their width and they have their inner ends connected with an edge of the backing strip. The inner ends of the tongues in one row are spaced laterally of the backing strip from the inner ends of the tongues in the other row. The tongues in each row are opposite to the spaces between the tongues in the other row. The result is that adjoining filter sheets can be clamped between one edge of a tongue in one row and one edge of an adjoining tongue in the opposite row in a manner similar to the action of a paper clip.

The invention is illustrated in the accompanying drawings, in which

Figure 7:
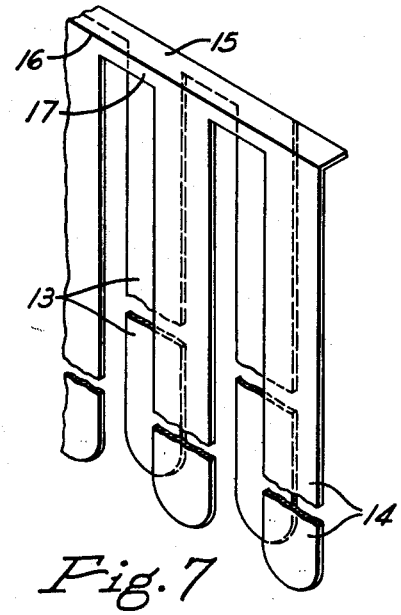
Figure 8:
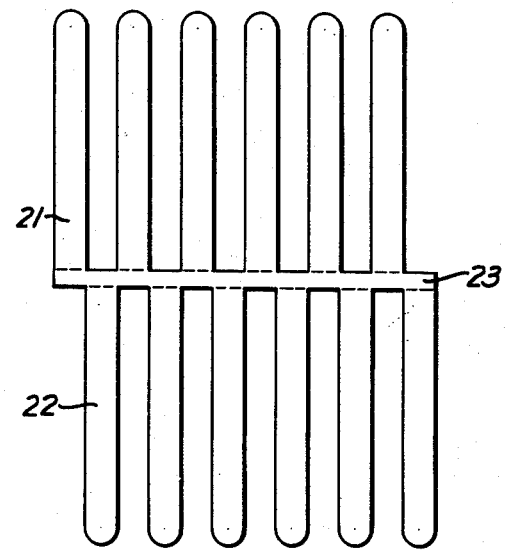
Figure 9:
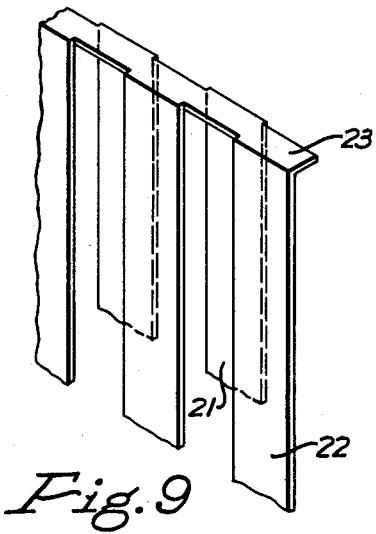

FIG. 1 is a side view of one of the filter sheet clamping and spacing device blanks;
FIG. 2 is a fragmentary perspective view of the device;
FIG. 3 is a reduced face view of a filter containing the clamping and spacing devices;
FIG. 4 is an enlarged fragmentary vertical section taken on the line IV—IV of FIG. 3;
FIG. 5 is a fragmentary vertical section taken on the line V—V of FIG. 4;
FIG. 6 is a plan view of a modification in the form of a blank;
FIG. 7 is an enlarged fragmentary perspective view of the blank after it has been folded; and FIGS. 8 and 9 are views, similar to FIGS. 6 and 7 respectively, of another embodiment of the invention.

Referring to FIG. 1 of the drawings, a flat blank 1 is formed from a strip of cardboard or similar inexpensive, relatively stiff material that can readily be bent. The strip is lanced to provide it with a plurality of parallel slits 2 of uniform length extending across it from one edge inwardly to points near the opposite edge of the strip to form parallel tongues 3 and 4 projecting from a backing strip 5. Preferably, all of the tongues are the same width and their free ends are rounded. The inner ends of alternate tongues 3 are provided with transverse lines of weakness, such as score lines 6, so that those tongues can readily be folded at right angles to the plane of the backing strip that connects them. The inner end portions of the remaining tongues 4 likewise have score lines 7 across them, but they are spaced a short distance from the inner ends of the slits; that is, a short distance from the backing strip. When all of the tongues have been bent or folded along their score lines substantially perpendicularly to the backing strip as shown in FIG. 2, the device is complete. It will be seen that the tongues are arranged in two closely spaced parallel rows and that the tongues in each row are spaced apart a distance at least as great as their width. Also, the inner ends of the tongues in one row are spaced laterally of the backing strip from the inner ends of the tongues in the adjoining row. Finally, it will be observed that the tongues in each row are opposite the spaces between the tongues in the other row.

A long strip of suitable filtering material, such as filter cloth, is accordion folded in a well known manner to form a stack of integrally connected filter sheets 10. The top and bottom sheets are then secured to the inside of the top and bottom of a frame 11 shown in FIGS. 3, 4 and 5. The frame is much taller than the original stack of sheets, so in attaching the stack to it the stack is expanded and the sheets become spaced apart in zigzag relation. However, if the sheets are left unsupported between their edges, they will sag and also would be drawn or forced together in pairs by the fluid passing through them in use. Therefore, adjoining sheets are fastened together at laterally spaced intervals along lines extending lengthwise of the filter strip, with the lines in each row located about midway between the lines of the rows directly above and below them to provide a large number of open-end pockets, the walls of which are held apart. A number of the clamping and spacing devices shown in FIG. 2 are used for this purpose. Several of them are inserted from each side of the filter into the spaces between the folds, with each backing strip 5 extending across the folds. When the tongues of one of these devices are forced into the filter they will positively separate the filter sheets that they extend between, but the two sheets between each adjoining pair of tongues 3 and 4 will be pressed or clamped together between the edges of the two tongues. There is room for two sheets to extend between the edges of a pair of tongues because the disposition of the tongues in two rows creates spaces between the tongue edges in one row and the tongue edges in the other row, even though in the flat blank all of the tongues substantially engaged one another.

The clamping devices that are inserted from one face or side of the filter are located about halfway between those inserted from the opposite side, so that the filter is provided with pockets that open from both of its sides, as shown in FIG. 4. A tongue 3 or 4 holds every pocket open, but since the tongues at one side of the filter are staggered relative to those at the opposite side, the end tongues 3a on the spacing devices at one side of the filter are made only half as wide as the rest of the tongues because the corresponding pockets are only half as high as most of them, as shown in FIG. 5.

These combination clamping and spacing devices can be made of cheap light-weight material by merely stamping them out of continuous strip. The different blanks can then be packed and shipped flat, because the backing strips do not need to be folded over until ready for use. The act of folding the backing strip at right angles to the tongues produces the two rows of staggered tongues. If a blank happens to be too long for the filter in which it is to be used, the excess length can simply be torn off at the backing strip.

A modified sheet clamping and spacing device is shown in FIG. 7. This is formed from the flat blank shown in FIG. 6. The blank is stamped from a strip or sheet of cardboard or the like to provide two rows of tongues 13 and 14 extending away from opposite sides of a central backing strip 15. The tongues in each row are spaced apart a distance no less than the width of a tongue, and the tongues in one row are directly opposite the spaces between the tongues in the other row. No material is wasted in cutting out the blanks because the material that is removed to form the spaces between the tongues can be the tongues of adjoining blanks. Each backing strip 15 is defined by a pair of parallel lines of weakness, such as score lines 16. These lines permit the blank to be folded easily in order to arrange the tongues in two parallel rows. The material connecting the inner ends of the tongues with the backing strip forms narrow flanges 17 that help stiffen the backing strip. This device is used in the same manner as the one shown in FIG. 2. After it has been inserted between the filter sheets in a zigzag filter unit, the two rows of tongues can be pinched toward each other to clamp the intervening filter sheets more tightly between the tongues.

In the modification shown in FIGS. 8 and 9, the blank and the completed spacing device are the same as those shown in FIGS. 6 and 7, respectively, except in this latest modification the inner ends of the tongues 21 and 22 are joined directly to the opposite edges of the central backing strip 23, instead of being connected to it through narrow flanges. Although the backing strip will not be so stiff as the one in FIG. 7, it will lie flatter against the filter folds.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A filter sheet clamping and spacing device made from a sheet of stiff material, said device consisting of a flat backing strip adapted to extend across the folds joining the sheets of an accordion folded filter strip, and two closely spaced rows of parallel tongues extending away from said backing strip in planes substantially perpendicular to the plane of the backing strip and adapted to extend in between said folds, the tongues in each row being spaced apart a distance substantially equal to their width and having their inner ends connected with an edge of the backing strip, the inner ends of the tongues in one row being spaced laterally of the backing strip from the inner ends of the tongues in the other row, and the tongues in each row being opposite to the spaces between the tongues in the other row, whereby adjoining filter sheets can be clamped between one edge of a tongue in one row and one edge of an adjoining tongue in the other row.

2. A filter sheet clamping and spacing device made from a sheet of stiff material, said device consisting of a flat backing strip adapted to extend across the folds joining the sheets of an accordion folded filter strip, and two closely spaced rows of parallel tongues extending away from the same edge of said backing strip in planes substantially perpendicular to the plane of the backing strip and adapted to extend in between said folds, the tongues in each row being spaced apart a distance substantially equal to their width, said backing strip edge having laterally offset areas to space the inner ends of the tongues in one row laterally of the backing strip from the inner ends of the tongues in the other row, and the tongues in each row being directly opposite to the spaces between the tongues in the other row, whereby adjoining filter sheets can be clamped between one edge of a tongue in one row and one edge of an adjoining tongue in the other row.

3. A filter sheet clamping and spacing device made from a sheet of stiff material, said device consisting of a flat backing strip adapted to extend across the folds joining the sheets of an accordion folded filter strip, and two closely spaced rows of parallel tongues extending away from the opposite edges of said backing strip in planes substantially perpendicular to the plane of the backing strip and adapted to extend in between said folds, the tongues in each row being spaced apart a distance substantially equal to their width, and the tongues in each row being directly opposite to the spaces between the tongues in the other row, whereby adjoining filter sheets can be clamped between one edge of a tongue in one row and one edge of an adjoining tongue in the other row.

4. A filter comprising an accordion folded filter strip having sheets integrally connected by parallel folds, and laterally spaced substantially parallel combination clamping and spacing devices extending across said folds and in between said sheets from opposite sides of said strip, said devices being made from stiff sheet material with those at one side of the sheet alternating with those at the opposite side to form pockets between the sheets, each device consisting of a flat backing strip extending across the adjacent folds in the filter strip, and two closely spaced rows of parallel tongues extending away from said backing strip and in between said folds to space them apart, the plane of the backing strip being substantially perpendicular to the planes of the tongues, the tongues in each row being spaced apart a distance substantially equal to their width and having ends connected with an edge of the backing strip, said ends of the tongues in one row of each device being spaced laterally of the backing strip from the adjacent ends of the tongues in the other row, the tongues in each row being opposite to the spaces between the tongues in the other row, and each pair of adjoining filter sheets being clamped between one edge of a tongue in one row and one edge of an adjacent tongue in the other row of the same clamping and spacing device.

5. A filter according to claim 4, in which both rows of tongues of each clamping and spacing device extend away from the same edge of its backing strip, and said edge has laterally offset areas to space the adjoining ends of the tongues in one row laterally of the backing strip from the adjoining ends of the tongues in the other row.

6. A filter according to claim 4, in which the two rows of tongues of each clamping and spacing device extend away from opposite edges of its backing strip.

References Cited in the file of this patent

UNITED STATES PATENTS

| 1,884,616 | Dooley | Oct. 25, 1932 |
| 2,681,155 | Graham | June 15, 1954 |

FOREIGN PATENTS

| 1,089,216 | France | Sept. 29, 1954 |